J. NORWOOD.
Bird-Cages.
No. 156,037.  Patented Oct. 20, 1874.
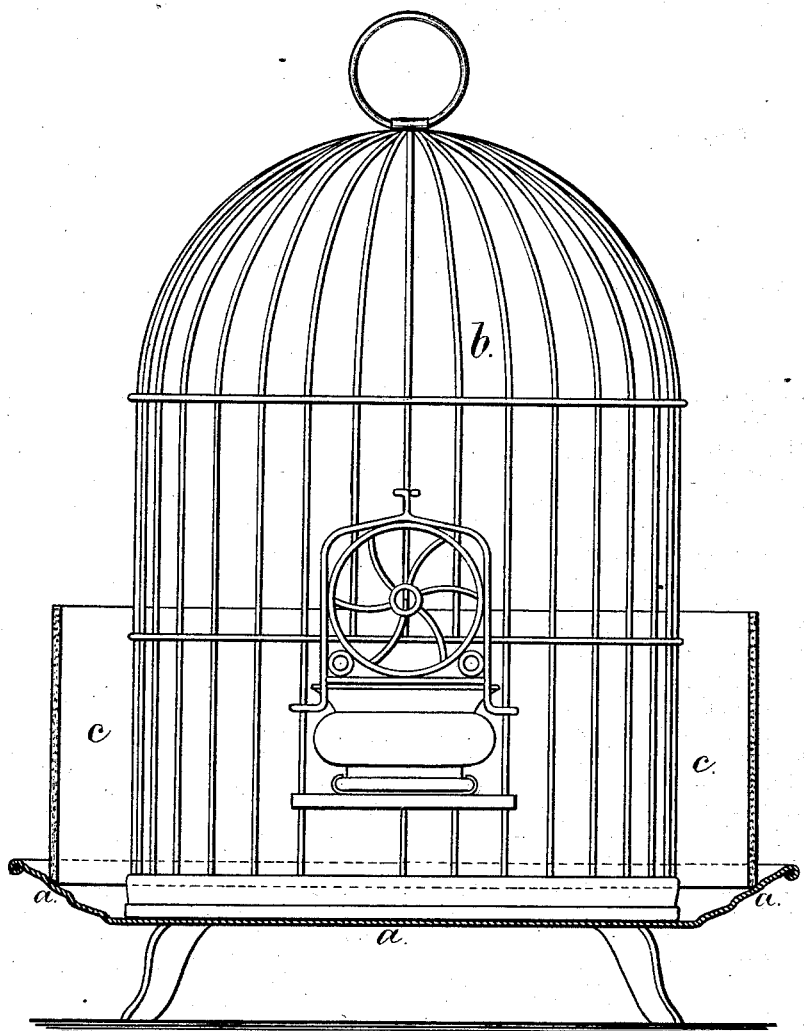
Witnesses,
Inventor
Joseph Norwood
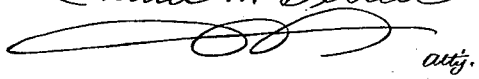

UNITED STATES PATENT OFFICE.

JOSEPH NORWOOD, OF BROOKLYN, NEW YORK.

IMPROVEMENT IN BIRD-CAGES.

Specification forming part of Letters Patent No. 156,037, dated October 20, 1874; application filed February 3, 1874.

*To all whom it may concern:*

Be it known that I, JOSEPH NORWOOD, of Brooklyn, in the county of Kings and State of New York, have invented an Improvement in Bird-Cages, of which the following is a specification:

Bird-cages have been made of wire, and also partially of glass and partially of wire. In the cages made partially of glass there is difficulty in cleaning the inner surface without frightening the bird; besides this, the glass is liable to be broken and the bird to escape. In cages that are made of wire the seed and pieces of wood are liable to be scattered, and the water is also thrown outside the cage when the bird is washing. In consequence of these things birds are objectionable in parlors and other places where the water and pieces scattered injure furniture, carpets, &c.

My invention is intended to obviate these difficulties, and consists in a cylinder of glass applied outside the wire bird-cage on the projecting bottom of the cage, whereby the scattering of seed, &c., is prevented. The glass can be lifted off and cleaned. It adds to the ornamental appearance, and in case of injury to the glass the bird is safe from escape or harm.

In the drawing I have represented a bird-cage with my cylindrical protector in place, the bottom of the cage and the protector being in section.

The bottom $a$ of the cage and the wire cage $b$ are connected together in any usual manner, and the cage is of any desired size or shape. The cylinder, of glass, $c$ is of a size to rest upon the bottom $a$ outside the cage $b$. This cylinder $c$ is of a height to prevent the scattering of seed, &c. This cylinder can be removed or replaced, and can easily be cleaned, and will effectually retain any seed or other substance that would otherwise be scattered.

The edges of the glass shield may be ground smooth or covered with a band of paper, metal, or other material.

I am aware that a fender of wire-cloth has been applied around a bird-cage to prevent scattering of food, and water is likely to pass through the same when a bird is washing.

My glass shield effectually prevents water or seed being scattered. It can be kept clean with great ease; it is not liable to rust or to accumulate offensive matter, and does not interfere with freely seeing the bird.

I claim as my invention—

The improved bird-cage, made with a removable cylindrical glass shield resting upon the base and outside the wire portion of the cage, as and for the purposes set forth.

Signed by me this 29th day of January, A. D. 1874.

JOSEPH NORWOOD.

Witnesses:
GEO. T. PINCKNEY,
CHAS. H. SMITH.